(12) United States Patent
Li et al.

(10) Patent No.: US 9,811,554 B2
(45) Date of Patent: Nov. 7, 2017

(54) ASSISTING QUERY AND QUERYING (71) Applicant: INTERNATIONAL BUSINESS MACHINES CORPORATION, Armonk, NY (US)

(72) Inventors: Li Li, Beijing (CN); Chi Liu, Beijing (CN); Ju Wei Shi, Beijing (CN); Qi Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 14/367,902

(22) PCT Filed: Oct. 31, 2012

(86) PCT No.: PCT/CN2012/083882
§ 371 (c)(1),
(2) Date: Jun. 21, 2014

(87) PCT Pub. No.: WO2013/097546
PCT Pub. Date: Jul. 4, 2013

(65) Prior Publication Data
US 2015/0161207 A1   Jun. 11, 2015

(30) Foreign Application Priority Data
Dec. 30, 2011 (CN) .......................... 2011 1 0461370

(51) Int. Cl.
G06F 17/30 (2006.01)
(52) U.S. Cl.
CPC .... *G06F 17/30424* (2013.01); *G06F 17/3033* (2013.01); *G06F 17/30864* (2013.01)
(58) Field of Classification Search
CPC ......... G06F 17/30598; G06F 17/30958; G06F 17/30864; G06F 17/30702; G06F 3/067;
(Continued)

(56) References Cited

U.S. PATENT DOCUMENTS 5,991,714 A * 11/1999 Shaner ................ G06F 17/2775
704/1
6,279,007 B1 * 8/2001 Uppala ............. G06F 17/30961
(Continued)

FOREIGN PATENT DOCUMENTS

CN    101150489 A    3/2008
CN    101354718 A    1/2009
(Continued)

OTHER PUBLICATIONS

Li, L. et al. Application No. GB1412863.1, Examination Report dated Nov. 13, 2014.
(Continued)

*Primary Examiner* — Michelle Owyang
(74) *Attorney, Agent, or Firm* — A. Imtiaz Billah (57) ABSTRACT

A method for assisting query comprises acquiring a record that includes a unique identification and at least one piece of dimension information associated with the unique identification, wherein each piece of dimension information includes a sequence of attributes, each attribute being ordered in the sequence in accordance with a hierarchically progressive relation; calculating a hash value for an attribute pair comprising attributes of every two neighboring levels; and storing, in association with the hash value, the unique identification in at least one storage device. A method for querying comprises receiving a query; calculating one or more hash values; in response to the one or more hash values matching stored hash values in at least one storage device; deriving an intersection of unique identifications that are stored in association with the matched stored hash values; and returning at least one unique identification included in the intersection as a query result.

9 Claims, 8 Drawing Sheets (58) Field of Classification Search
CPC ......... G06F 17/30097; G06F 17/30312; G06F 17/30997; G06F 17/30477; G06F 17/3033
USPC .................................................. 707/705–780
See application file for complete search history.

(56) References Cited

U.S. PATENT DOCUMENTS

| | | | |
|---|---|---|---|
| 6,871,201 B2* | 3/2005 | Yu .................... | G06F 17/30705 707/737 |
| 8,027,983 B1* | 9/2011 | Nandy ................ | G06F 17/3033 707/747 |
| 2002/0073138 A1* | 6/2002 | Gilbert .................. | G06F 17/30 709/201 |
| 2005/0038804 A1 | 2/2005 | Shimizu | |
| 2007/0027856 A1 | 2/2007 | Lee | |
| 2007/0130112 A1* | 6/2007 | Lin ..................... | G06F 17/3002 |
| 2008/0157930 A1 | 7/2008 | Winkler et al. | |
| 2009/0164414 A1 | 6/2009 | Tatzel et al. | |
| 2009/0300038 A1* | 12/2009 | Chen ................ | G06F 17/30563 |
| 2010/0223262 A1* | 9/2010 | Krylov ............. | G06F 17/30997 707/728 |
| 2012/0158719 A1* | 6/2012 | Gannu ................ | G06F 17/2785 707/732 |
| 2013/0086245 A1* | 4/2013 | Lu ........................ | G05B 13/02 709/223 |

FOREIGN PATENT DOCUMENTS

| | | |
|---|---|---|
| CN | 101789027 A | 7/2010 |
| CN | 101840417 A | 9/2010 |
| CN | 102096871 A | 6/2011 |
| CN | 102214176 A | 10/2011 |
| CN | 103186653 A | 7/2013 |
| DE | 112012005533 T5 | 10/2014 |
| WO | 2004044785 A1 | 5/2004 |
| WO | 2011080549 A1 | 7/2011 |
| WO | 2013097546 A1 | 7/2013 |

OTHER PUBLICATIONS

Fabian B. "Implementing Secure P2P-ONS". IEEE ICC 2009 proceedings. Copyright 2009 IEEE.

"System and method for the dynamic optimization of query tables". IP.com No. IPCOM000197961D.IP.com Electronic Publication: Jul. 23, 2010.

PCT/CN2012/083882 International Search Report with Written Opinion, Dec. 12, 2012.

Guinard D., et al. "Interacting with the SOA-based Internet of Things: Discovery, Query, Selection, and On-Demand Provisioning of Web Services". IEEE Transactions on Services Computing—Year: 2010, vol. 3, Issue: 3 pp. 223-235, DOI: 10.1109/TSC.2010.3 Cited by: Papers (204) | Patents (6) IEEE Journals & Magazines.

Ordille J., et al. "Distributed Active Catalogs and Meta-Data Caching in Descriptive Name Services". [1993] Proceedings. The 13th International Conference on Distributed Computing Systems Year: 1993 pp. 120-129, DOI: 10.1109/ICDCS.1993.287716.

\* cited by examiner

| Device ID | Location | Device Type | Owner | Others |
|---|---|---|---|---|
| 0001 | Beijing:Haidian:shang di:Dia:2F:206 | Sensor:ReadOnly:BloodPres sure:Family:Nova | IBMGCG:CRL:Health care | ... |
| 0002 | Beijing:Haidian:shang di:Ring:2F:206 | Sensor:PubAuto:BloodPress ure:Family:Etcom | IBMGCG:CSDL:IoT | ... |
| ... | ... | ... | ... | ... |

ASSISTING QUERY AND QUERYING

CROSS-REFERENCE TO RELATED APPLICATIONS

This is a U.S. National Phase application which claims priority to International Application PCT/CN2012/083882, filed Oct. 31, 2012, which in turn claims priority to Patent Application No. CN 201110461370.1, filed on Dec. 30, 2011. The contents of both of these applications are incorporated herein by reference in their entireties.

FIELD OF THE INVENTION

Embodiments of the present invention relate to the query field. More specifically, embodiments of the present invention relate to a method and apparatus for assisting query, a method and apparatus for querying, and a naming query system.

BACKGROUND OF THE INVENTION

Figure 1:
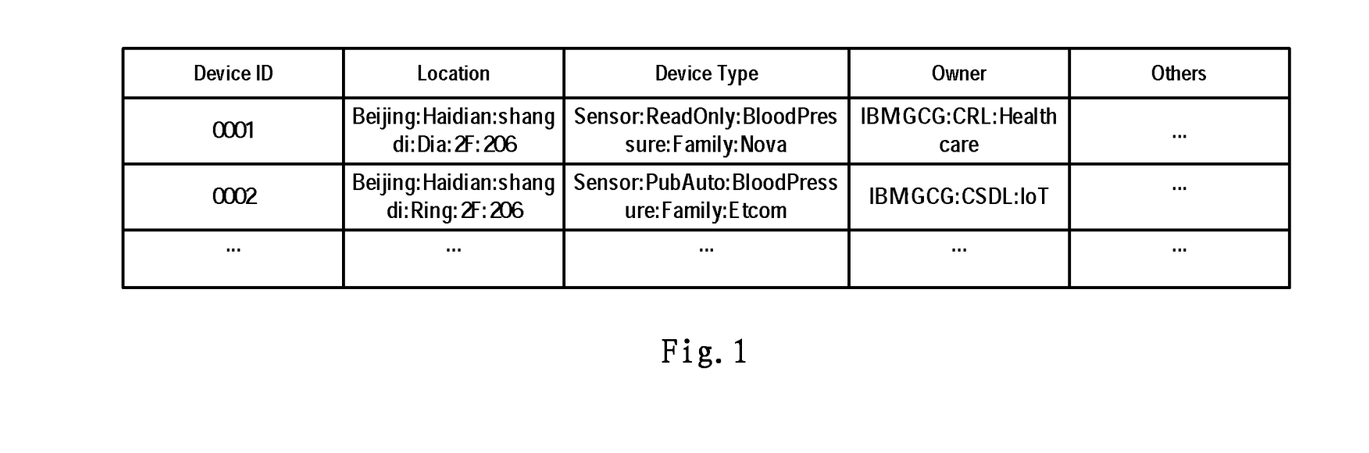
FIG. 1 schematically shows a diagram of a device profile.

In the Internet of Things (IoT), each device (for example, a sensor) has its own unique identification (for example, device identifier (ID), such as 0001, 0002, etc.) that distinguishes itself from other devices. As illustrated in FIG. 1, these unique identifications may be stored in a device profile in association with other dimension information of the device (for example, Location, Device Type, Owner, and Others). Those skilled in the art would appreciate that the device profile can be a table stored in a database.

It may be seen from FIG. 1 that each piece of dimension information may include at least one attribute. For example, "Location" dimension information of a device 0001 includes "Beijing," "Haidian," "Shangdi," "Dia (Diamond, name of a building)," "2F" and "206 (room)."

In order to implement a plurality of demands, an application executed in the IOT may require searching a certain device in the IOT. Generally, this search is implemented by querying a device unique identification stored in the device profile based on some device profile conditions.

It is known that a LIKE keyword in a structured query language (SQL) statement may be used to implement the query. For example, in order to search all family blood pressure meters, the SQL statement may be:
SELECT DeviceID (1)
FROM table Device_profile as t (2)
WHERE t.DeviceType LIKE "% BloodPressure:Family %" (3)

SUMMARY OF THE INVENTION

The inventors find that the query efficiency in IOT as implemented with SQL statements is rather low. Besides, because the device profile has much redundant information, the storage space is wasted.

Besides, the inventors also find, a domain name server (DNS) used in Internet is not suitable for IoT, because DNS can only implement a one-to-one mapping between an Internet protocol (IP) address and a domain name, while the IoT query may involve a one-to-many mapping (for example, as illustrated in FIG. 1, the family blood pressure meters at least include Device IDs 0001 and 0002).

Likewise, the inventors further find that, a radio frequency identification (RFID) naming is not suitable for IoT either, because the RFID can only implement one-to-one mapping between the RFID ID and RFID unified resource locator (URL).

To this end, it is desired that the embodiments of the present invention provide a method and apparatus for assisting query, a method and device for querying, and a naming querying system.

Specifically, according to one aspect of the present invention, a method of assisting query may, for example, comprise: acquiring a record that includes a unique identification and at least one piece of dimension information associated with the unique identification, wherein each piece of dimension information includes a sequence of attributes, each attribute being ordered in the sequence in accordance with a hierarchically progressive relation; calculating a hash value for an attribute pair in every piece of dimension information, wherein the attribute pair comprises attributes of every two neighboring levels; and storing, in association with the hash value, the unique identification in at least one storage device.

According to another aspect of the present invention, a method of querying may, for example, comprise: receiving a query that includes at least one piece of dimension information, each piece of dimension information including a sequence of attributes, at least one sequence comprising attributes of at least two neighboring levels ordered in accordance with a hierarchically progressive relation; calculating one or more hash values for one or more attribute pairs comprising attributes of every two neighboring levels from the attributes of at least two neighboring levels; in response to existence of matches between the one or more hash values and stored hash values in at least one storage device, deriving an intersection of unique identifications that are stored in association with the matched stored hash values; and returning at least one unique identification included in the intersection as a query result.

According to another aspect of the present invention, an apparatus for assisting query may, for example, comprise: acquiring means configured to acquire a record that includes a unique identification and at least one piece of dimension information associated with the unique identification, wherein each piece of dimension information includes a sequence of attributes, each attribute being ordered in the sequence in accordance with a hierarchically progressive relation; calculating means configured to calculate a hash value for an attribute pair in every piece of dimension information, wherein the attribute pair comprises attributes of every two neighboring levels; and storing means configured to store, in association with the hash value, the unique identification in at least one storage device.

According to a further aspect of the present invention, an apparatus for querying may, for example, comprise: receiving means configured to receive a query that includes at least one piece of dimension information, each piece of dimension information including a sequence of attributes, at least one sequence comprising attributes of at least two neighboring levels ordered in accordance with a hierarchically progressive relation; calculating means configured to calculate one or more hash values for one or more attribute pairs comprising attributes of every two neighboring levels from the attributes of at least two neighboring levels; identification acquiring means configured to, in response to existence of matches between the one or more hash values and stored hash values in at least one storage device, deriving an intersection of unique identifications that are stored in association with the matched stored hash values; and returning means configured to return at least one unique identification included in the intersection as a query result.

According to a yet further aspect of the present invention, a naming query system, for example, may comprise an apparatus for assisting query and an apparatus for querying.

A method and apparatus for assisting query according to embodiments of the present invention may alternatively merely store unique identifications and associated hash values using an appropriate data structure (for example, a hash table) without storing a device profile containing much redundant information, thereby saving storage space.

Besides, because a hash value and a unique identification may be flexibly added, deleted, and/or changed in an appropriate storage structure, thereby enhancing the scalability of the storage structure.

A method and device for querying according to embodiments of the present invention, by calculating unique hash value(s) and performing query with the unique hash value(s), unique identification(s) associated therewith may be derived, thereby improving the query efficiency.

According to a naming query system according to embodiments of the present invention, because it covers the functionalities of a device for assisting query and of a device for querying, users may have a better experience in the aspects of storage space and query efficiency.

BRIEF DESCRIPTION OF THE DRAWINGS

Through reading the following detailed description with reference to the accompanying drawings, the above and other objectives, features and advantages of the exemplary embodiments of the present invention will become more comprehensible. In the drawings, a plurality of embodiments of the present invention will be illustrated in an exemplary and non-limiting manner, where.

In the drawings, like or corresponding numerical signs indicate the same or corresponding parts.

DETAILED DESCRIPTION

Hereinafter, the principle and spirit of the present invention will be described with reference to various exemplary embodiments. It should be understood that provision of these embodiments is only to enable those skilled in the art to better understand and further implement the present invention, not intended for limiting the scope of the present invention in any manner.

According to the embodiments of the present invention, a method and apparatus for assisting query, a method and device for querying, and a naming querying system are provided.

In this context, it should be understood that the "acquiring" and "receiving" as involved may, for example, involve an "obtaining" process implemented by utilizing any existing, being developed, and to-be-developed wired or wireless communication manners; "record," for example, may involve a set of information; "unique identification," for example, may involve identifications that can distinguish the involved objects one from another; "dimension information," for example, may involve different aspects of information of the involved objects, for example, location, device type, etc.; "hierarchically progressive relation," for example, may involve a predefined hierarchical system to progress from upper levels to lower levels one by one. Of course, the serial numbers of each level may be set arbitrarily; and a device and a device ID may be used to interchangeably refer to the device represented by the ID. Besides, any arbitrary number of elements in the drawings is merely for exemplary, not restrictive purposes, and any naming is merely for distinguishing, without any restriction meaning.

Hereinafter, the principles and spirits of the present invention will be illustrated in detail with reference to a plurality of preferred embodiments with a piece of dimension information "Device Type" as illustrated in FIG. 1 as an example. Those skilled in the art may understand that the principle of the present invention is likewise applicable to other dimension information of a device, and the present invention is not limited in this aspect.

Exemplary Method of Assisting Query

Hereinafter, a method 200 for assisting query according to an exemplary embodiment of the present invention will be described with reference to FIG. 2 in conjunction with FIGS. 3A and 3B.

Figure 2:
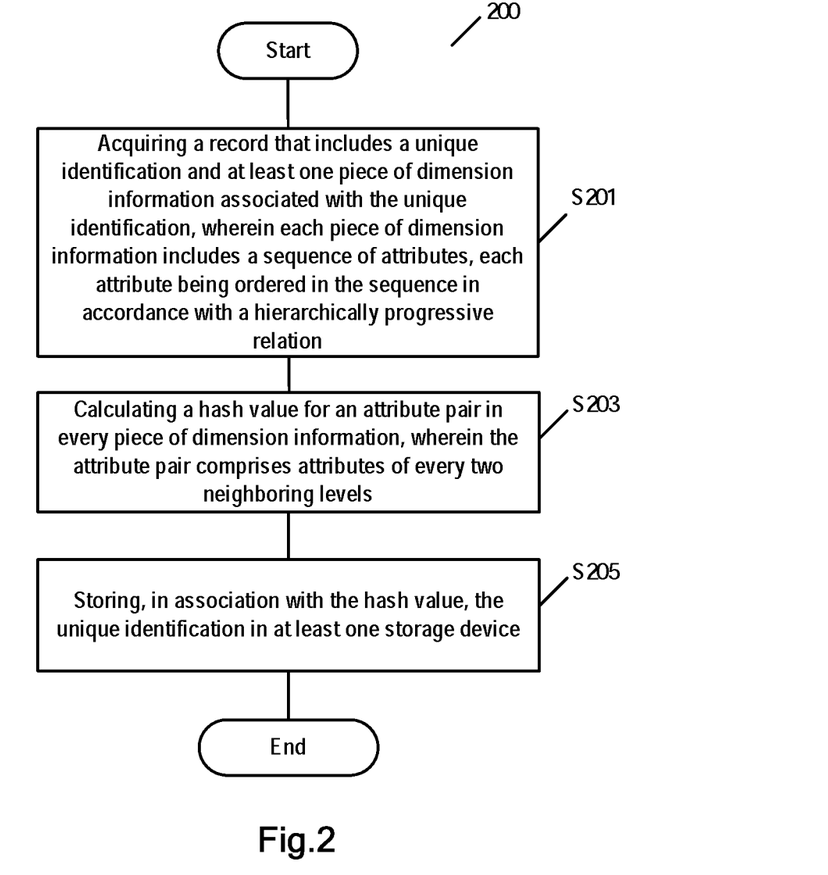
FIG. 2 schematically shows a flow chart of a method of assisting query according to an embodiment of the present invention.

As illustrated in FIG. 2, the method 200 may, for example, comprise step S201, namely, acquiring a record that includes a unique identification and at least one piece of dimension information associated with the unique identification, each piece of dimension information including a sequence of attributes, each attribute being ordered in the sequence in accordance with a hierarchically progressive relation.

Figure 3A:
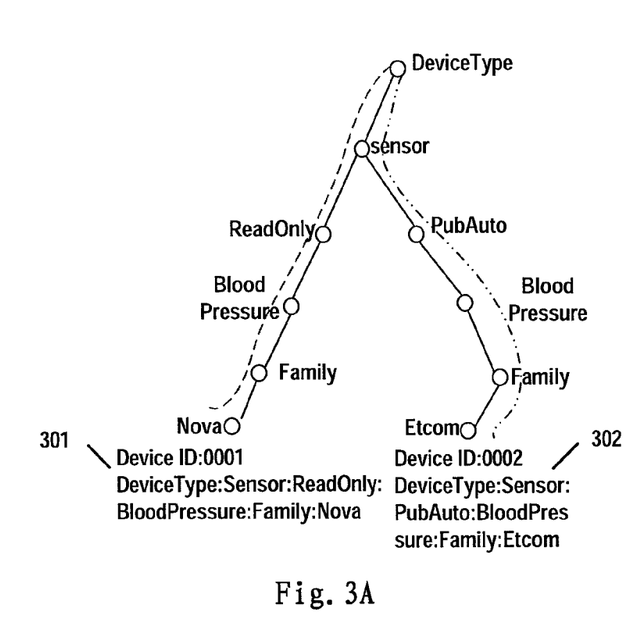
FIG. 3A schematically shows a tree diagram for illustrating a hierarchically progressive relation of a sequence of attributes included in a piece of dimension information according to an embodiment of the present invention.

With FIG. 3A as an example, suppose records 301 and 302 are acquired.

From FIG. 3A, the record 301 comprises a unique identification (namely, Device ID: 0001) and dimension information in association with the unique identification (i.e., Device Type). This dimension information includes a sequence of attributes, namely, "DeviceType:Sensor:ReadOnly:BloodPressure:Family:Nova." Each attribute is ordered in the sequence in accordance with a hierarchically progressive relation.

Specifically, the hierarchical relation for the sequence of attributes of the dimension information ("Device Type") included in the record 301 may be: "DeviceType" is located at the highest level; "Sensor" is located at the second level; and so forth, where "Nova (brand name)" is located at the sixth level. Those skilled in the art would readily appreciate that the scope of attributes at higher levels covers the scope of attributes at lower levels, which are generic concepts for attributes at lower levels, and the relation between every attributes is a hierarchically progressive relation. Those skilled in the art would also appreciate that such hierarchically progressive relation may be easily represented by a tree diagram. As illustrated in FIG. 3A, the path from the root node (DeviceType) of the tree diagram, along the left branch, to a leaf node (Nova) (illustrated in a dotted line) represents the sequence of attributes for the dimension information of record 301 which are ordered in accordance with a hierarchically progressive relation.

Likewise, the record 302 comprises a unique identification (namely, device ID: 0002) and dimension information in association with the unique identification (i.e., Device Type). This dimension information includes a sequence of attributes, namely, "DeviceType:Sensor:PubAuto:BloodPressure:Family:Etcom." Each attribute is ordered in the sequence in accordance with a hierarchically progressive relation.

As illustrated in FIG. 3A, the path from the root node (DeviceType) of the tree diagram, along the right branch, to a leaf node (Etcom) (illustrated in a chain line) represents the sequence of attributes for the dimension information of record 302 which are ordered in accordance with a hierarchically progressive relation.

Those skilled in the art would appreciate that the contents of the above records, the serial numbers for each level of attributes and their specific contents, are only exemplary for illustrating the embodiments of the present invention, not for limiting the present invention within the above particular contents. For example, the record may not contain the dimension information "Device Type," but other dimension information such as "Owner." For further example, the second level of the dimension information "Device Type" may start from "Electronics," instead of "Sensor."

Those skilled in the art would also appreciate that in this example, a larger hierarchical serial number represents a lower level, but in other embodiments, a smaller hierarchical serial number may instead be used to represent a lower level, and the present invention is not limited thereto, as long as the sequence of attributes are ordered in a hierarchically progressive manner.

Besides, it should be further noted that the tree diagram as illustrated in FIG. 3A is merely illustrated for vividly explaining that attributes of the present invention have a hierarchical relation. In fact, after acquiring the sequence of attributes, it is unnecessary to construct a tree diagram.

Further referring to FIG. 2, the method 200, for example, further comprises step S203, namely, calculating a hash value for an attribute pair in every piece of dimension information, wherein the attribute pair comprises attributes of every two neighboring levels.

As far as FIG. 3A is concerned, those skilled in the art would appreciate that "calculating a hash value for an attribute pair comprising attributes of every two neighboring levels in every piece of dimension information" refers to calculating hash values of respective edges (comprising nodes at two neighboring levels) on corresponding branches from the root node to respective leaf nodes of record 301 and record 302, respectively.

With the record 301 as an example, attribute pairs for which the hash values should be calculated include "DeviceType-Sensor," "Sensor-Readonly," "ReadOnly-BloodPressure," "BloodPressure-Family," and "Family-Nova."

Further, as illustrated by reference sign 303 of FIG. 3B, the hash values as calculated with respect to the dimension information ("Device Type") of record 301, for example, contain Hash(DeviceType-Sensor), Hash(Sensor-Readonly), Hash (ReadOnly-BloodPressure), Hash(BloodPressure-Family), and Hash(Family-Nova).

It should be noted that here, the present invention is not limited in specifically selecting which hash function, and Hash represents any hash function that can work out a unique hash value.

Next, with reference to FIG. 2 again, the method 200 for example may further comprise step S205, i.e., storing, in association with the hash value, the unique identification in at least one storage device.

Figure 3B:
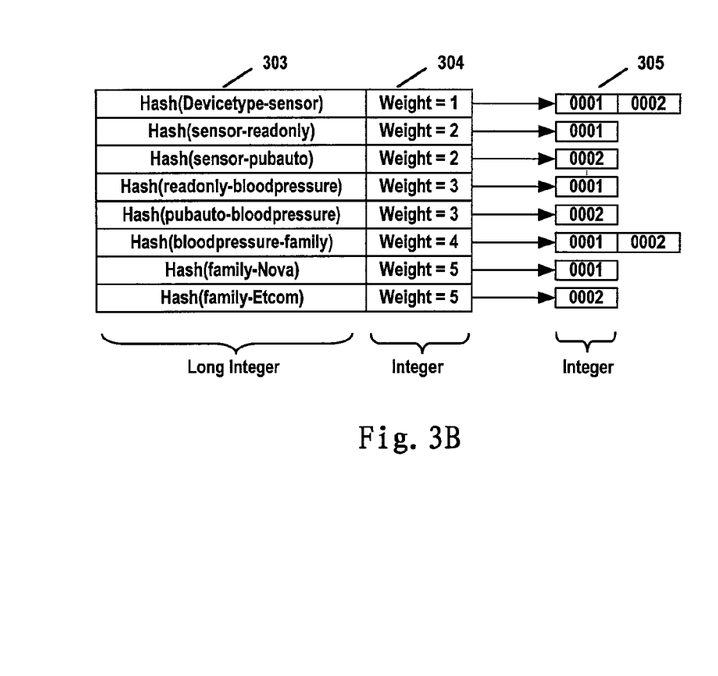
FIG. 3B schematically shows a storage structure diagram available for a method of assisting query according to an embodiment of the present invention.

Specifically, as illustrated in FIG. 3B, with the record 301 as an example, its hash values Hash(DeviceType-Sensor), Hash(Sensor-Readonly), Hash(ReadOnly-BloodPressure), Hash(BloodPressure-Family) and Hash (Family-Nova) are stored in association with the Device ID 0001 in at least one storage device.

Those skilled in the art would appreciate that at least one storage device may be located at the same geographical location or distributed geographically, as long as it is accessible. The present invention has no limitation thereto, and it may enhance the scalability of the embodiments of the present invention.

Besides, according to some embodiments of the present invention, hash values with respect to different dimension information and the unique identifications associated therewith may be collectively stored in an appropriate data structure (for example, hash table). The advantage for this practice may further reduce information redundancy.

According to some other embodiments of the present invention, hash values with respect to different dimension information and unique identifications associated therewith may be stored in a hash table specific for the dimension information. The advantage of such practice lies in the capability of pertinent query, thereby improving the query speed.

According to some embodiments of the present invention, in response to the hash value being different from stored hash values, the unique identification is stored in association with the hash value.

For example, as illustrated in FIGS. 3A and 3B, suppose hash values with respect to the Device ID 0001 are calculated and stored at first, then when the hash value for the attribute pair ("Bloodpressure" and "Family") is calculated for the first time, because the hash value Hash(Bloodpressure-Family) is different from stored hash values (Hash (DeviceType-Sensor), Hash(Sensor-ReadOnly) and Hash (ReadOnly-BloodPressure) have been previously stored), the unique identification (i.e., Device ID 0001) is stored in association with the hash value Hash(Bloodpressure-Family).

According to some embodiments of the present invention, in response to the hash value being identical to a stored hash value, the unique identification is stored in association with the stored hash value.

For example, as illustrated in FIGS. 3A and 3B, next, when the hash value of the attribute pair ("Bloodpressure" and "Family") is calculated with respect to the Device ID 0002, it would be found that the hash value Hash(Bloodpressure-Family) has been stored with respect to the Device ID 0001. At this point, only the unique identification (i.e., Device ID 0002) is stored in association with the stored hash value Hash(Bloodpressure-Family), without storing the repetitive hash value again as a new record. It turns out that as illustrated in FIG. 3B, the Device IDs stored in association with Hash(Bloodpressure-Family) comprise 0001 and 0002, while the hash value Hash(Bloodpressure-Family) is only stored once. The advantage of this practice lies in the capability of further saving the space of storage device.

Of course, according to some embodiments of the present invention, the hash value may be directly stored in association with the unique identification in the at least one storage device, while regardless of whether the hash value has been stored, and the present invention may be implemented in this way.

According to some embodiments of the present invention, the method 200, for example, may further alternatively comprise calculating a distance from the attribute pair to the attribute that is located at the highest level in the same dimension information, i.e., the difference between levels, as the weight associated with the hash value.

Specifically, according to some embodiments of the present invention, as illustrated in FIG. 3B, for example, the distance from the attribute pair ("DeviceType" and "Sensor") to the attribute (i.e., DeviceType) that is located at the highest level in the same dimension information (i.e., Device Type) may be for example, the distance between the attribute "Sensor" (namely, an attribute at a lower level in the attribute pair) to the attribute at the highest level (i.e., DeviceType), namely, 1 (as illustrated by reference sign 304 in FIG. 3B).

Of course, according to some embodiments of the present invention, the distance from the attribute pair ("DeviceType" and "Sensor") to the attribute (i.e., DeviceType) that is located at the highest level in the same dimension information (i.e., Device Type) may be for example, the distance between the attribute "DeviceType" (namely, an attribute at a higher level in the attribute pair) to the attribute at the highest level (i.e., DeviceType), namely, 0.

According to some embodiments of the present invention, after further calculating a weight, the method 200, for example, may comprise storing the weight in association with the unique identification and the hash value.

For example, as illustrated in FIG. 3B, the hash value Hash(DeviceType-Sensor), unique identifications (Device IDs 0001 and 0002) are stored in association with weight 1 (merely exemplary).

According to some embodiments of the present invention, the hash value may be stored in association with the weight in an array, and unique identifications may be stored in association with them using a link (as illustrated in FIG. 3B).

Those skilled in the art would appreciate that use of a link structure has an advantage of easily adding, deleting, and/or changing a unique identification. Of course, those skilled in the art would also appreciate that various data structures may be used to store the hash value in association with the weight and unique identification, the above mentioned is only exemplary, and the present invention will not be limited thereto.

According to some embodiments of the present invention, the hash value may adopt Long Integer, the weight may adopt Integer, and the unique identification may also adopt Integer (as illustrated in FIG. 3B). Those skilled in the art may also appreciate that these data types are merely exemplary, and the present invention has no limitation thereto.

According to some embodiments of the present invention, the method 200, for example, may be implemented in the IoT. Of course, those skilled in the art would appreciate that the method 200 may further be implemented in any field that contains a unique identification, for example, in a banking sector, where the bank card number of a client may be used as a unique identification. The scope of the present invention is not limited thereto.

It should be further noted that although the method 200 has been previously introduced with only one piece of dimension information, this principle is suitable for a record that records an arbitrary amount of dimension information, as long as repeating the above operations for each piece of dimension information.

Exemplary Method of Querying

Method 400 for querying according to an exemplary embodiment of the present invention may be described with reference to FIG. 4. It should be noted that in this example, suppose the dimension information "Device Type" of the Device ID 0001 and Device ID 0002 has been stored, as illustrated in FIG. 3B, in accordance with the method of assisting query of FIG. 2.

Figure 4:
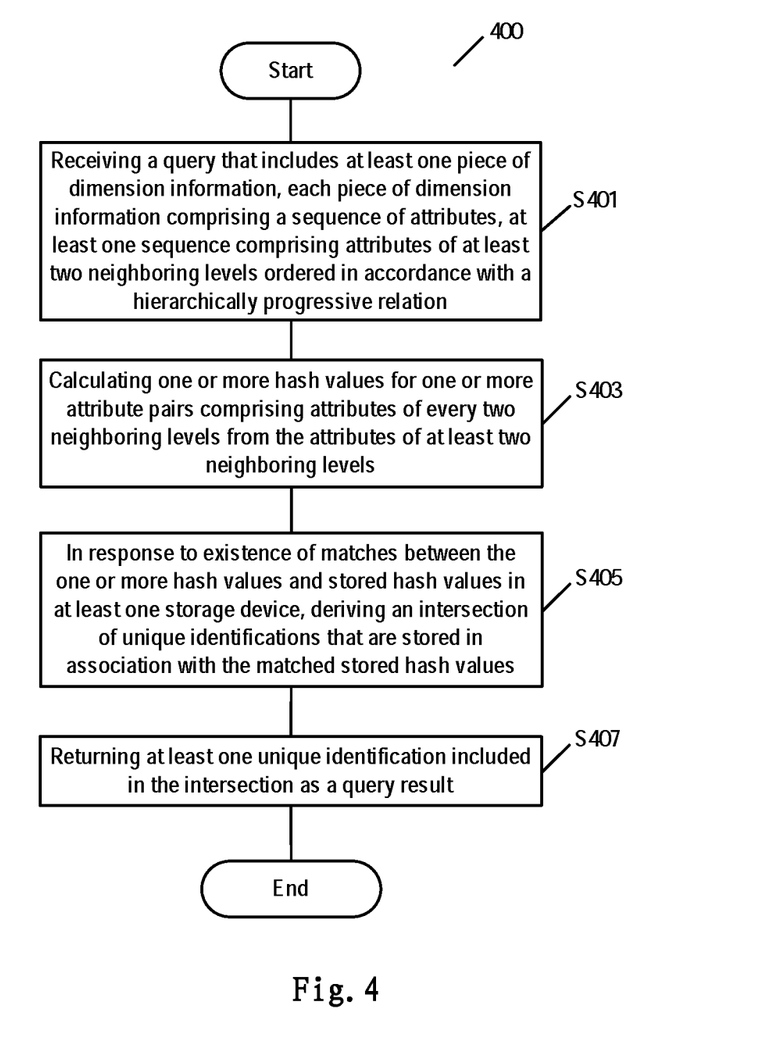
FIG. 4 schematically shows a flow chart of a method of querying according to an embodiment of the present invention.

As illustrated in FIG. 4, the method 400 may, for example, comprise step S401, namely, receiving a query that includes at least one piece of dimension information, each piece of dimension information comprises a sequence of attributes, at least one sequence including attributes of at least two neighboring levels ordered in accordance with a hierarchically progressive relation.

Specifically, suppose such a query is received, which comprises one piece of dimension information "Device Type," the dimension information including a sequence of attributes, the sequence including attributes of three neighboring levels which are ordered in accordance with a hierarchically progressive relation, for example, "DeviceType: Sensor:ReadOnly."

Next, with reference to FIG. 4, the method 400, for example, may further comprise step S403, namely, calculating one or more hash values of one or more attribute pairs comprising attributes at every two neighboring levels from the attributes of the at least two neighboring levels.

Continuing with the above example, it may be seen that it is needed to calculate the hash values of the attribute pairs comprising attributes at every two neighboring levels from the attributes "DeviceType:Sensor:ReadOnly" at three neighboring levels. In other words, it is needed to calculate Hash(DeviceType-Sensor) and Hash(Sensor-ReadOnly).

Further, as illustrated in FIG. 4, the method 400, for example, may comprise step S405, namely, in response to existence of matches between the one or more hash values and stored hash values in at least one storage device, deriving an intersection with respect to unique identifications stored in association with the matched stored hash values.

Continuing with the above example, it may be seen with reference to FIG. 3B that the calculated Hash(DeviceType-Sensor) and Hash(Sensor-ReadOnly) match the stored Hash (DeviceType-Sensor) and Hash(Sensor-ReadOnly). Therefore, an intersection is derived with respect to the unique identifications (0001, 0002; 0001, respectively) in association with the matched stored Hash(DeviceType-Sensor) and Hash(Sensor-ReadOnly), thereby deriving the Device ID 0001.

As illustrated in FIG. 4, the method 400, for example, may further comprise step S407, namely, returning at least one unique identification included in the intersection as a query result.

As far as the above example is concerned, it is needed to return the unique identification 0001 as a query result. From FIG. 3A, it would be easily verified that this query result is correct, because only record 301 comprises the attribute pair "Sensor-ReadOnly."

According to the embodiments of the present invention, when the hash value and unique identification are stored in association with a weight, the query process may be expedited by utilizing the weight in such a manner as deriving an intersection with respect to the unique identifications stored in association with the matched stored hash values in a descending order of weights. The reason for this practice is that the greater the weight is, the lower is the level of the attribute pair for calculating the hash value, i.e., the closer the attribute pair is to the leaf node, the greater is the possibility of associating solely with a unique identification.

Besides, according to some embodiments of the present invention, the process of deriving an intersection may occur in response to working out all hash values. In other words, if the received query comprises attributes at a plurality of neighboring levels for calculating hash values, all hash values may be worked out with respect to all attribute pairs, and then these hash values are matched with the stored hash values, and further, an intersection between unique identifications in association with the matched hash values is derived.

Further, according to some other embodiments of the present invention, after working out some hash values (at least two) with respect to a part of attribute pairs, these derived hash values may be matched with the stored hash values, and further the intersection of unique identifications in association with the matched hash values is derived. It would be appreciated that if an identifier that, for example, is NULL is derived through performing the above partial calculations, matching, and deriving an intersection, it would be unnecessary to calculate other hash values, thereby saving calculation resources.

Exemplary Apparatus for Assisting Query

After introducing the methods according to the exemplary embodiments of the present invention, next, the block diagram of the apparatus 500 for assisting query according to an exemplary embodiment of the present invention will be described with reference to FIG. 5. Hereinafter, the apparatus is called assisting query apparatus 500 for the sake of brevity.

Figure 5:
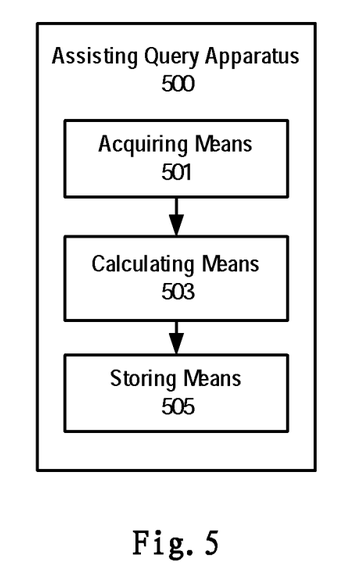
FIG. 5 schematically shows a block diagram for an apparatus for assisting query according to an embodiment of the present invention.

As illustrated in FIG. 5, the assisting query apparatus 500 may, for example, comprise: an acquiring means 501 configured to acquire a record that includes a unique identification and at least one piece of dimension information associated with the unique identification, wherein each piece of dimension information includes a sequence of attributes, each attribute being ordered in the sequence in accordance with a hierarchically progressive relation; a calculating means 503 configured to calculate a hash value for an attribute pair in every piece of dimension information, wherein the attribute pair comprises attributes of every two neighboring levels; and a storing means 505 configured to store, in association with the hash value, the unique identification in at least one storage device.

According to some exemplary embodiments of the present invention, the storing means 505 for example may comprise means configured to store, in association with the hash value, the unique identification in response to the hash value being different from stored hash values; and means configured to store, in association with a stored hash value, the unique identification in response to the hash value being identical to the stored hash value.

According to some exemplary embodiments of the present invention, the assisting query apparatus 500, for example, may further comprise: a weight calculating means configured to calculate a distance from an attribute pair to an attribute that is located at the highest level in same dimension information, as a weight associated with the hash value; and wherein, the storing means 505 comprises: means configured to store the weight in association with the hash value and the unique identification.

According to some exemplary embodiments of the present invention, the storing means 505, for example, may comprise: means configured to store the hash value in an array, and to store the unique identification in association with the hash value by utilizing a link.

According to some exemplary embodiments of the present invention, the storing means 505, for example, may comprise: means configured to store the weigh in association with the hash value and in the array and to store the unique identification in association with the hash value and the weight by utilizing a link.

According to some exemplary embodiments of the present invention, the assisting query apparatus 500, for example, may be implemented in the IoT.

Exemplary Apparatus for Querying

After introducing the assisting query apparatus 500 according to the exemplary embodiments of the present invention, next, the block diagram of the apparatus 600 for querying according to the exemplary embodiments of the present invention will be described with reference to FIG. 6. Hereinafter, this apparatus is called querying apparatus 600 for the sake of brevity.

Figure 6:
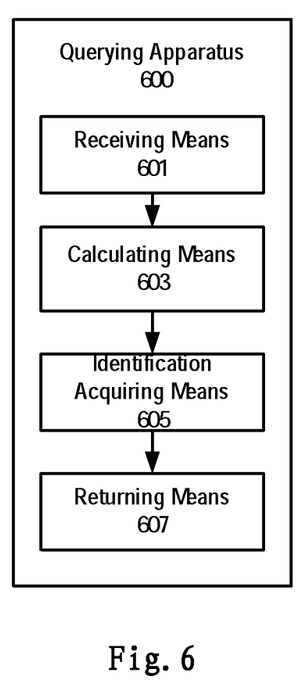
FIG. 6 schematically shows a block diagram for an apparatus for querying according to an embodiment of the present invention.

As illustrated in FIG. 6, the querying apparatus 600 may, for example, comprise: a receiving means 601 configured to receive a query that includes at least one piece of dimension information, each piece of dimension information including a sequence of attributes, at least one sequence comprising attributes of at least two neighboring levels ordered in accordance with a hierarchically progressive relation; a calculating means 603 configured to calculate one or more hash values for one or more attribute pairs comprising attributes of every two neighboring levels from the attributes of at least two neighboring levels; an identification acquiring means 605 configured to, in response to existence of matches between the one or more hash values and stored hash values in at least one storage device, derive an intersection of unique identifications that are stored in association with the matched stored hash values; and a returning means 607 configured to return at least one unique identification included in the intersection as a query result.

Those skilled in the art would appreciate that the calculating means 603 as illustrated in FIG. 6 and the calculating means 503 as illustrated in FIG. 5 may be implemented by a same means, because the two implement a same function.

According to some exemplary embodiments of the present invention, in the case that a stored hash value is further stored in association with a weight, wherein the weight represents a distance from an attribute pair for calculating a stored hash value to an attribute that is located at the highest level in same dimension information, the identification acquiring means 605, for example, may comprise: means configured to derive, in a descending order of weights, an intersection of unique identifications that are stored in association with the matched stored hash values.

According to some exemplary embodiments of the present invention, the identification acquiring means 605 is configured to operate in response to all hash values or certain hash values having been calculated.

Exemplary Naming Query System

After introducing the assisting query device 500 and the querying device 600 according to the exemplary embodiments of the present invention, next, a naming query system 700 according to an exemplary embodiment of the present invention will be described with reference to FIG. 7.

Figure 7:
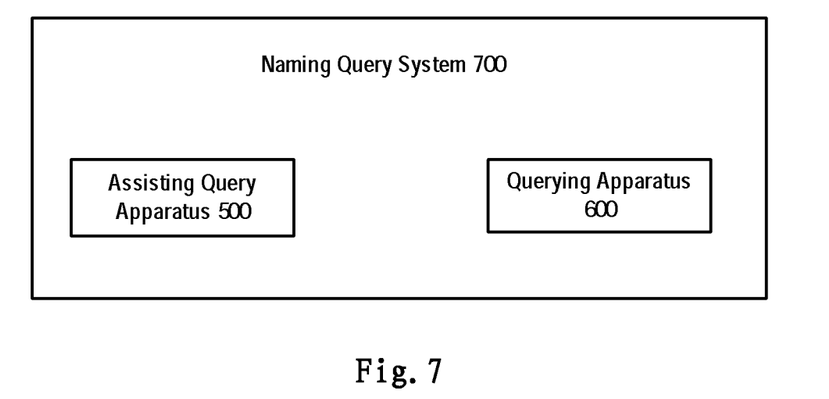
FIG. 7 schematically shows a block diagram for a naming query system according to an embodiment of the present invention.

As illustrated in FIG. 7, the naming query system 700, for example, may comprise the functions of the assisting query device 500 and the querying device 600.

Exemplary Computing Device

Figure 8:
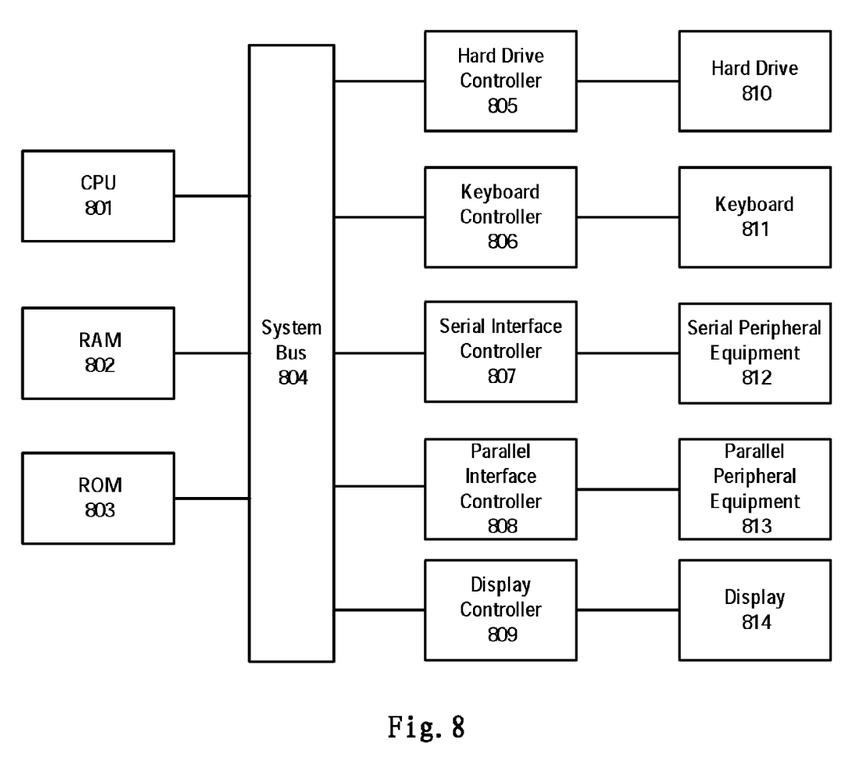
FIG. 8 shows an exemplary computing device which is applicable to implement the embodiments of the present invention.

Hereinafter, a computing device capable of implementing the present invention will be described with reference to FIG. 8. FIG. 8 shows a structural block diagram of a computing device which is applicable to implement the embodiments of the present invention.

As shown in FIG. 8, the computing device may include: a CPU (Central Process Unit) 801, a RAM (Random Access Memory) 802, a ROM (Read Only Memory) 803, a system bus 804, a hard drive controller 805, a keyboard controller 806, a serial interface controller 807, a parallel interface controller 808, a display controller 809, a hard drive 810, a keyboard 811, a serial peripheral equipment 812, a parallel peripheral equipment 813 and a display 814. Among above devices, the CPU 801, the RAM 802, the ROM 803, the hard drive controller 805, the keyboard controller 806, the serial interface controller 807, the parallel controller 808 and the display controller 809 are coupled to the system bus 804. The hard drive 810 is coupled to the hard drive controller 805. The keyboard 811 is coupled to the keyboard controller 806. The serial peripheral device 812 is coupled to the serial interface controller 807. The parallel peripheral device 813 is coupled to the parallel interface controller 808. And, the display 814 is coupled to the display controller 809. It should be understood that the structure as shown in FIG. 8 is only for exemplary purpose rather than any limitation to the present invention. In some cases, some devices can be added or reduced as based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer usable program codes embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard drive, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that the above division of every aspects is only for clarity, and features in respective aspects can be combined within the aspect or between aspects. It should also be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the present invention has been depicted with reference to a plurality of embodiments, it should be understood that the present invention is not limited to the disclosed embodiments. On the contrary, the present invention intends to cover various modifications and equivalent arrangements included in the spirit and scope of the appended claims. The scope of the appended claims meets the broadest explanations and covers all such modifications and equivalent structures and functions.

What is claimed is:

1. A method, comprising:
constructing a storage device profile contained within each storage device among the plurality of storage devices networked within an Internet of Things environment, based on: a naming query system, an assisting query apparatus, and a querying apparatus, wherein the storage device profile performs one-to-one mapping and one-to-many mapping;
acquiring a record that includes a unique identification and at least one piece of dimension information associated with the unique identification, wherein each piece of dimension information includes a sequence of attributes, wherein each attribute is sequentially ordered in accordance with a hierarchically progressive relation;
calculating a hash value for an attribute pair in each piece of dimension information, wherein the attribute pair comprises attributes of every two neighboring levels;
matching the hash value with the unique identification, wherein the unique identification is stored in at least one storage device;
storing the hash value in an array, wherein the hash value is a distance from a pair of attribute pairs to an attribute located at a highest level in a piece of dimension information in which the distance is same as a weight associated with the hash value;
comparing a hash value not in the array to the hash value in the array, wherein the hash value not in the array is either identical to or different from the hash value in the array;
in response to comparing the hash value not in the array to the hash value in the array, matching the hash value not in the array with the unique identification where the hash value not in the array is identical to the hash value in the array;
in response to matching the hash value not in the array, deriving an intersection of the unique identification matched with the hash value in the array;
identifying information that is redundant by utilizing a linking structure in conjunction with the naming query and the querying apparatus, wherein the linking structure stores in the array the unique identification and the weight associated with the hash value; and
in response to identifying that information is redundant, deleting the redundant information contained in each storage device by deleting the hash value in the array which matches with the unique identification.

2. The method according to claim 1, further comprising:
calculating the distance from the attribute pair to the attribute located at the highest level in the dimension information in which the distance is the same as the weight associated with the hash value; and
wherein the weight is associated with the hash value and the unique identification.

3. The method of claim 1, further comprising:
receiving a query that includes at least one piece of dimension information, each piece of dimension information including a sequence of attributes, at least one sequence comprising attributes of at least two neighboring levels ordered in accordance with a hierarchically progressive relation; and
in response to matching the hash value not in the array to the hash value in the array,
returning the unique identification included in the intersection as a query result to the received query.

4. A computer program product, the computer program product comprising:
one or more computer readable tangible storage media and program instructions stored on at least one of the one or more storage media, the program instructions comprising:
program instructions to construct a storage device profile contained within each storage device among the plurality of storage devices, based on: a naming query, an assisting query apparatus, and a querying apparatus, wherein the storage device profile performs one-to-one mapping and one-to-many mapping;
program instructions to acquire a record that includes a unique identification and at least one piece of dimension information associated with the unique identification, wherein each piece of dimension information includes a sequence of attributes, wherein each attribute is sequentially ordered in accordance with a hierarchically progressive relation;
program instructions to calculate a hash value for an attribute pair in each piece of dimension information, wherein the attribute pair comprises attributes of every two neighboring levels;
program instructions to match the hash value with the unique identification, wherein the unique identification is stored in at least one storage device;
program instructions to store the hash value in an array, wherein the hash value is a distance from a pair of attribute pairs to an attribute located at a highest level in a piece of dimension information in which the distance is same as a weight associated with the hash value;
program instructions to compare a hash value not in the array to the hash value in the array, wherein the hash value not in the array is either identical to or different from the hash value in the array;
in response to comparing the hash value not in the array to the hash value in the array, program instructions to match the hash value not in the array with the unique identification where the hash value not in the array is identical to the hash value in the array;

in response to matching the hash value not in the array to the hash in the array, program instructions to derive an intersection of unique identifications matched with the hash value in the array;

program instructions to identify information that is redundant by program instructions to utilize a linking structure in conjunction with the naming query and the querying apparatus, wherein the linking structure stores in the array the unique identification and the weight associated with the hash value; and in response to identifying that information is redundant, deleting the redundant information contained in the storage device by deleting the hash value in the array which matches with the unique identification.

5. The computer program product of claim 4, further comprising:

program instructions to calculate the distance from the attribute pair to the attribute located at the highest level in the dimension information in which the distance is the same as the weight associated with the hash value; and program instructions to store the weight in association with the unique identification and the hash value.

6. The computer program product of claim 4, further comprising:

program instructions to receive a query that includes at least one piece of dimension information, each piece of dimension information including a sequence of attributes, at least one sequence comprising attributes of at least two neighboring levels ordered in accordance with a hierarchically progressive relation; and in response to matching the hash value not in the array to the hash value in the array, program instructions to return the unique identification included in the intersection as a query result to the received query.

7. A computer system comprising:
one or more computer processors;
one or more computer readable storage media; and
program instructions stored on the computer readable storage media for execution by at least one of the one or more computer processors, the program instructions comprising:

program instructions to construct a storage device profile contained within each storage device among the plurality of storage devices networked within an Internet of Things environment, based on: a naming query, an assisting query apparatus, and a querying apparatus, wherein the storage device profile performs one-to-one mapping and one-to-many mapping in order to implement the Internet of Things with the plurality of storage devices;

program instructions to acquire a record that includes a unique identification and at least one piece of dimension information associated with the unique identification, wherein each piece of dimension information includes a sequence of attributes, wherein each attribute is sequentially ordered in accordance with a hierarchically progressive relation;

program instructions to calculate a hash value for an attribute pair in each piece of dimension information, wherein the attribute pair comprises attributes of every two neighboring levels;

program instructions to match the hash value with the unique identification, wherein the unique identification is stored in at least one storage device;

program instructions to store the hash value in an array, wherein the hash value is a distance from a pair of attribute pairs to an attribute located at a highest level in a piece of dimension information in which the distance is same as a weight associated with the hash value program instructions to compare a hash value not in the array to the hash value in the array, wherein the hash value not in the array is either identical to or different from the hash value in the array;

in response to comparing the hash value not in the array to the hash value in the array, program instructions to match the hash value not in the array with the unique identification where the hash value not in the array is identical to the hash value in the array;

in response to matching the hash value not in the array to the hash value in the array, program instructions to derive an intersection of the unique identification matched with the hash value in the array;

program instructions to identify information that is redundant by program instructions to utilize a linking structure in conjunction with the naming query and the querying apparatus, wherein the linking structure stores in the array the unique identification and the weight associated with the hash value; and in response to identifying that information is redundant, program instructions to delete the redundant information contained in the storage device by deleting the hash value in the array which has matches with the unique identification.

8. The computer system according to claim 7, further comprising:

program instructions to calculate the distance from the attribute pair to the attribute located at the highest level in the dimension information in which the distance is the same as the weight associated with the hash value; and program instructions to store the weight in association with the unique identification and the hash value.

9. The computer system of claim 7, further comprising:
program instructions to receive a query that includes at least one piece of dimension information, each piece of dimension information comprising a sequence of attributes, at least one sequence comprising attributes of at least two neighboring levels ordered in accordance with a hierarchically progressive relation; and in response to matching the hash value not in the array to the hash value in the array, program instructions to return the unique identification included in the intersection as a query result to the received query.

\* \* \* \* \*